US006557838B2

(12) United States Patent
Wirges

(10) Patent No.: US 6,557,838 B2
(45) Date of Patent: May 6, 2003

(54) HYDRAULIC ENGINE MOUNT HAVING A ONE-PIECE INNER SUPPORT STRUCTURE

(75) Inventor: Todd Michael Wirges, Angola, IN (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 0 days.

(21) Appl. No.: 09/998,509

(22) Filed: Nov. 30, 2001

(65) Prior Publication Data

US 2002/0066986 A1 Jun. 6, 2002

Related U.S. Application Data

(60) Provisional application No. 60/250,383, filed on Dec. 1, 2000.

(51) Int. Cl.[7] ................................................. F16M 5/00
(52) U.S. Cl. ................ 267/140.12; 267/219; 267/141.4
(58) Field of Search ....................... 267/140.11, 140.12, 267/219, 140.13, 141.4; 248/562, 636, 638

(56) References Cited

U.S. PATENT DOCUMENTS

| | | | | |
|---|---|---|---|---|
| 5,145,155 A | * | 9/1992 | Funahashi et al. ..... | 267/140.12 |
| 5,170,999 A | * | 12/1992 | Ishiyama ................ | 267/140.12 |
| 5,199,691 A | * | 4/1993 | Bouhier et al. ........ | 267/140.12 |
| 5,286,011 A | * | 2/1994 | Strand .................... | 267/140.12 |
| 5,344,126 A | * | 9/1994 | Ishiyama ................ | 267/140.12 |
| 5,558,316 A | * | 9/1996 | Lee et al. ............... | 267/140.12 |
| 5,711,513 A | * | 1/1998 | Bretaudeau et al. ... | 267/140.12 |
| 6,308,941 B1 | * | 10/2001 | Tsutsumida ............ | 267/140.12 |

* cited by examiner

Primary Examiner—Matthew C. Graham
Assistant Examiner—Mariano Sy
(74) Attorney, Agent, or Firm—MacMillan, Sobanski & Todd, LLC

(57) ABSTRACT

A hydraulic engine mount includes a bushing assembly having a core bonded to an inner support structure by an elastomeric material. The inner support structure includes a first ring, a second ring, and a plurality of legs. The first ring includes an annular wall, an outer end wall, and an inner end wall. The second ring includes an annular wall, an outer end wall, and an inner end wall. The legs are integrally formed with and between the first and second rings, so that the first ring, the second ring, and the legs are formed as a one-piece component that does not require a post-forming operation. A housing receives the bushing assembly. Fluid chambers are formed between the bushing assembly and the housing to dampen vibrations as hydraulic fluid is displaced between the chambers.

12 Claims, 4 Drawing Sheets

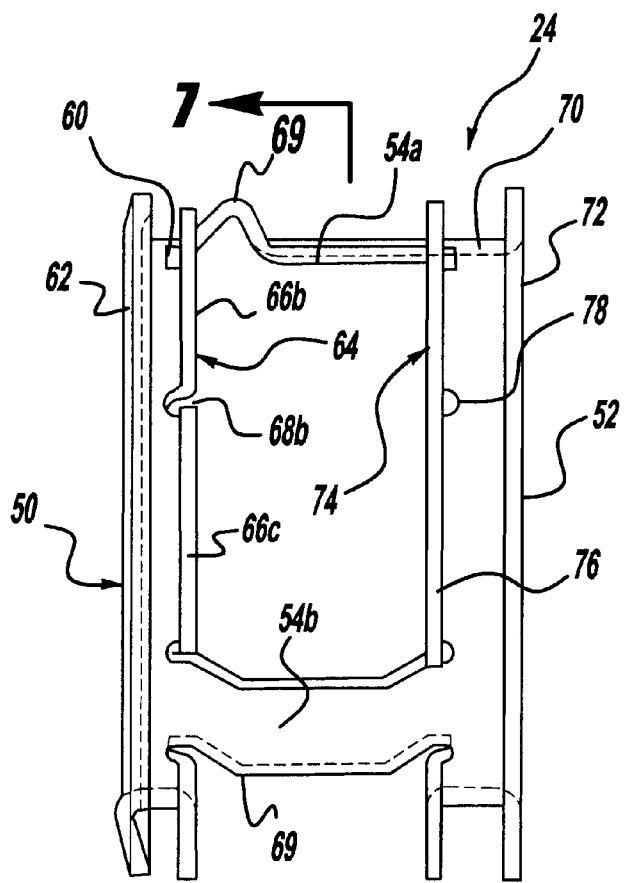
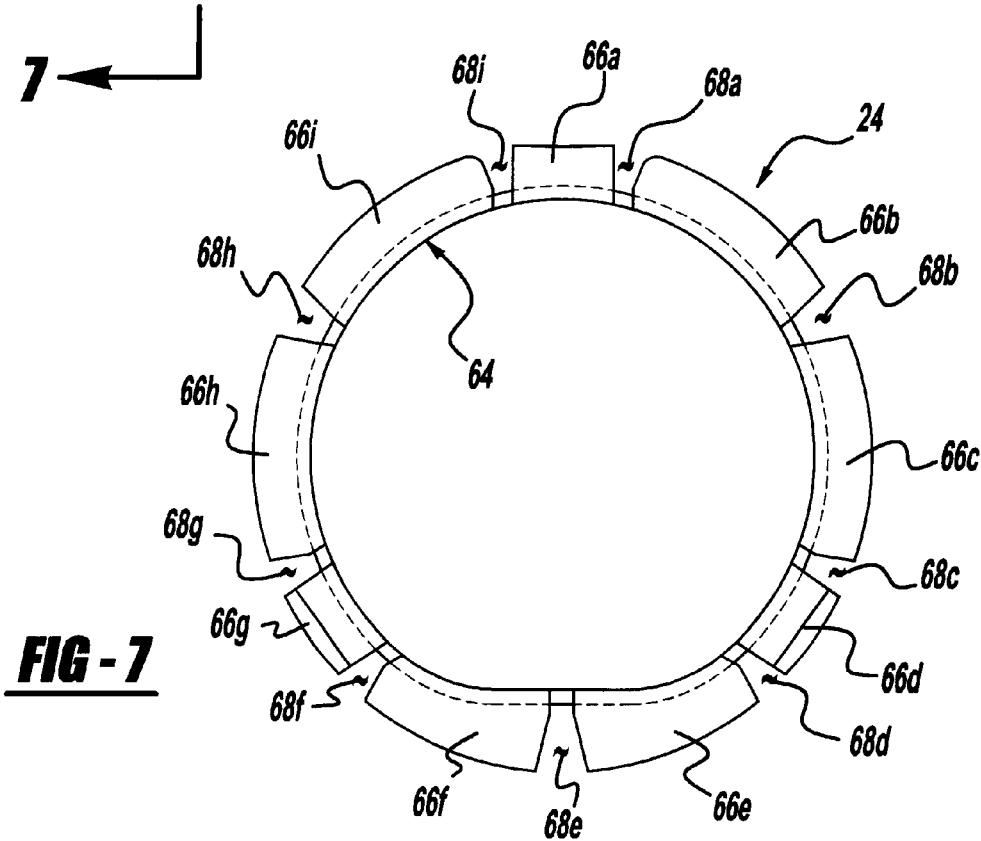

HYDRAULIC ENGINE MOUNT HAVING A ONE-PIECE INNER SUPPORT STRUCTURE

CROSS REFERENCE TO RELATED APPLICATION

This claims the benefit of U.S. provisional patent application identified as Application No. 60/250,383, filed Dec. 1, 2000.

BACKGROUND OF THE INVENTION

This invention relates in general to hydraulic bushings. More specifically, this invention relates to a hydraulic engine mount for dampening vibrations transmitted between a vehicular engine and a chassis.

Hydraulic bushings or mounts are used to dampen and reduce vibrations transmitted between an engine and a chassis in vehicles. Generally, a hydraulic engine mount includes an inner core connected to an inner support structure, commonly known as an inner ring, by an elastomeric material to form an assembly. The assembly is received in a housing. The housing is mounted to an engine and a chassis. A hydraulic fluid is provided in a chamber formed between the assembly and the housing. When the engine or chassis receives a vibration, hydraulic fluid in the engine mount is displaced into desired chambers to dampen the vibration and reduce its transmission.

Conventional hydraulic mounts use two rings that are connected, usually by a welding process, to form the inner support structure. The process of welding the rings together can result in undesirable product quality, performance, and costs. Furthermore, the use of two rings and their post-forming operations increases the product cost.

SUMMARY OF THE INVENTION

The present invention includes an inner support structure for a hydraulic engine mount. The inner support structure is formed as a one-piece member and requires no post-forming operations. The elimination of post-forming operations, such as welding and/or crimping processes, reduces the cost of the product, and improves product performance and quality.

In a preferred embodiment, a hydraulic engine mount includes a bushing assembly having a core bonded to an inner support structure by an elastomeric material. The inner support structure includes a first ring, a second ring, and a plurality of legs. The first ring includes an annular wall, an outer end wall, and an inner end wall. The second ring includes an annular wall, an outer end wall, and an inner end wall. The legs are integrally formed with and between the first and second rings, so that the first ring, the second ring, and the legs are formed as a one-piece component that does not require a post-forming operation. A housing receives the bushing assembly. Fluid chambers are formed between the bushing assembly and the housing to dampen vibrations as hydraulic fluid is displaced between the chambers.

BRIEF DESCRIPTION OF THE DRAWINGS

FIG. 6 is an end view of the inner support structure of FIG. 5.

FIG. 7 is a sectional view of the inner support structure taken along line 7—7 of FIG. 6.

DETAILED DESCRIPTION OF THE PREFERRED EMBODIMENT

Figure 1:
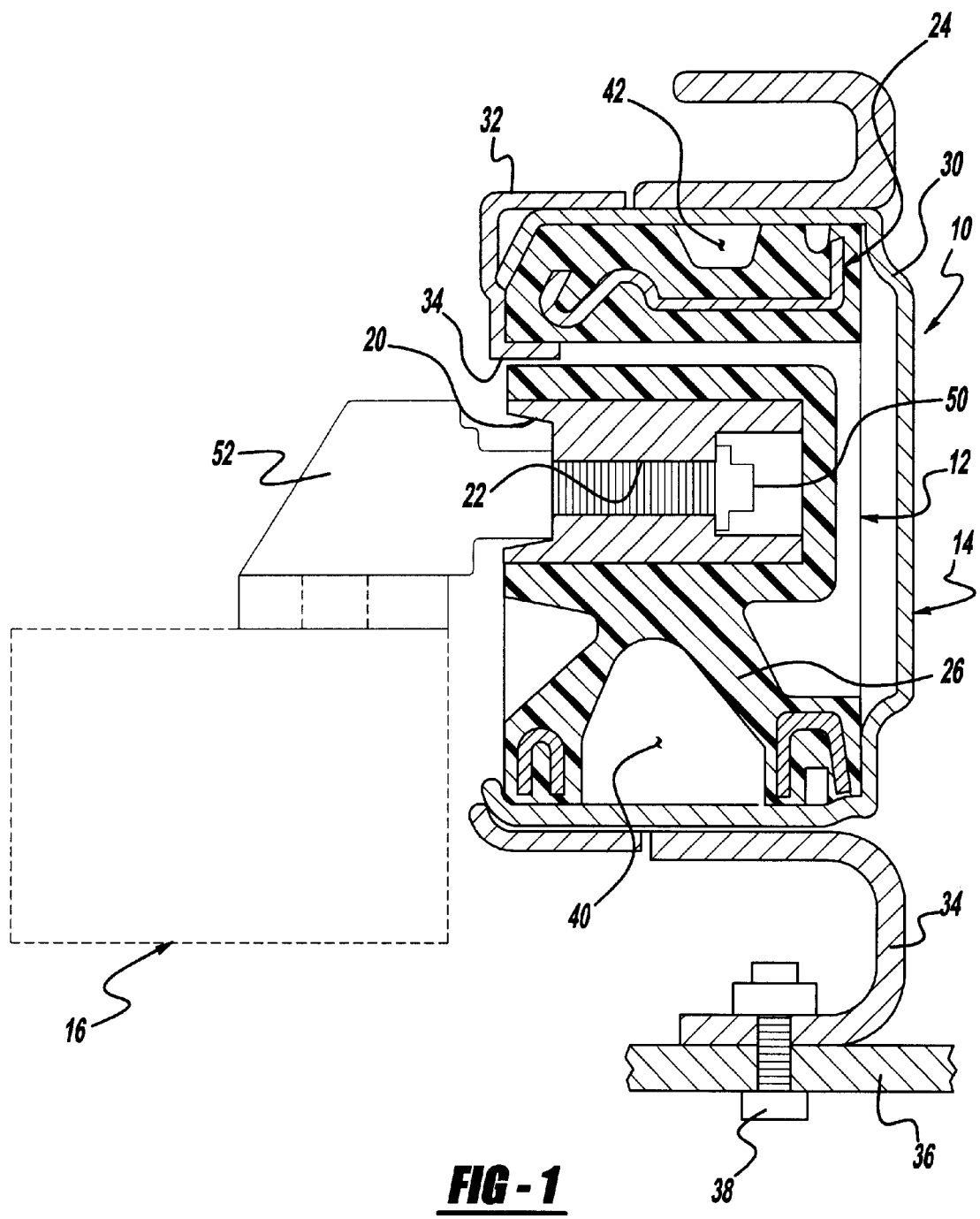
FIG. 1 is a sectional view of a hydraulic engine mount according to this invention.

A hydraulic bushing or mount is indicated generally at 10 in FIG. 1. The hydraulic mount 10 is particularly adapted for use as an engine mount in a vehicle.

The hydraulic engine mount 10 includes a bushing assembly indicated generally at 12 and a housing indicated generally at 14. As described below in detail, hydraulic fluid is provided in chambers formed between the bushing assembly 12 and the housing 14 to dampen vibrations from and to a vehicular engine, indicated generally and schematically at 16.

The bushing assembly 12 includes a hollow cylindrical core 20, preferably formed from a metal. An axial passage 22 is formed in the core 20. An inner support structure, indicated generally at 24 and described in detail below, is an annular member that receives the core 20. Preferably, the inner support structure 24 is formed from a drawable or moldable material. An elastomeric material 26 is bonded to an outer surface of the core 20 and to surfaces of the inner support structure 24. The elastomeric material 26 encapsulates the inner support structure 24 in a bonding process.

The housing 14 includes a cup-shaped can 30 that receives the bushing assembly 12. A travel restrictor 32 includes a flange 34 that overlaps at least a portion of the bushing assembly 12. The can 30 and travel restrictor 32 are received by a bracket 34, which is mounted to a chassis, body, or other desired element 36 by fasteners 38.

A first fluid chamber 40 is formed between the bushing assembly 12 and the housing 14. Specifically, the fluid chamber 40 is formed between the elastomeric material 26 arid the can 30. A second fluid chamber 42 is formed between the elastomeric material 26 and the can 30. Other chambers (not illustrated) can be formed. A fluid conduit (not illustrated) is provided between chambers 40 and 42 so that hydraulic fluid can travel between the chambers 40 and 42 to provide damping in a known manner.

Figure 2:
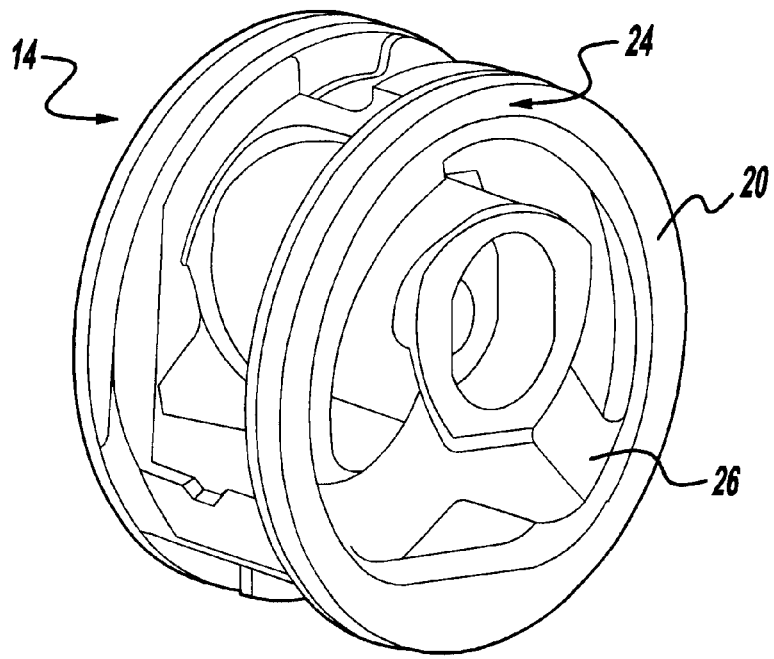
FIG. 2 is a perspective view of a bushing assembly according to this invention removed from the engine mount of FIG. 1 for clarity, wherein an elastomeric material has been illustrated as transparent to show an inner support structure of the bushing assembly.
Figure 3:
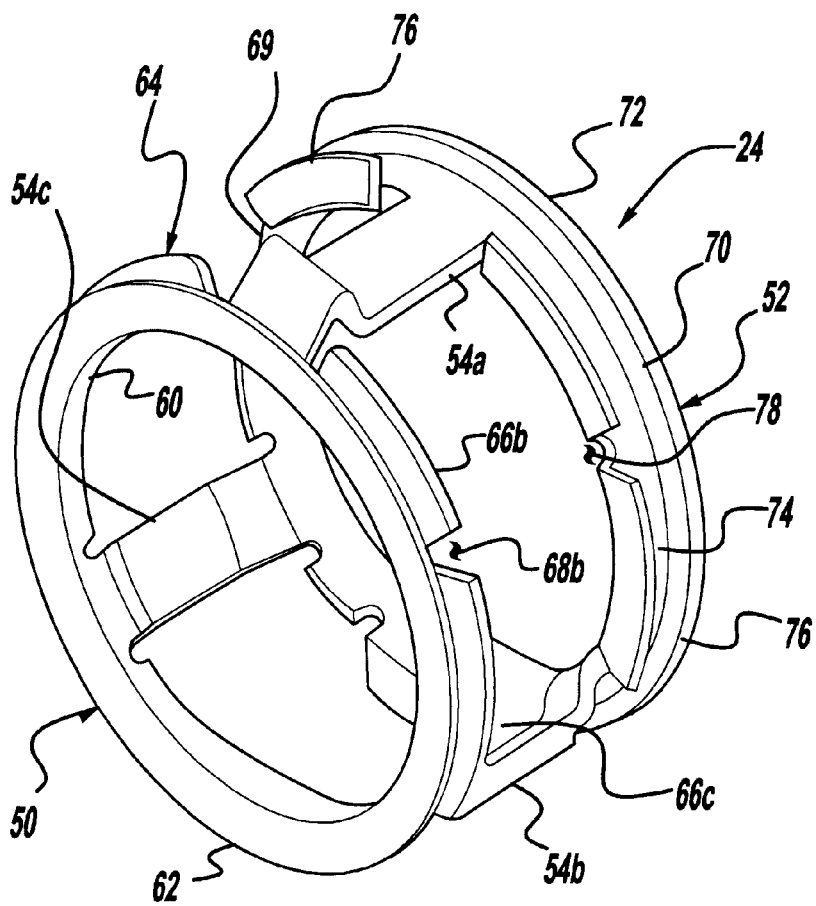
FIG. 3 is a front perspective view of the inner support structure according to this invention, removed from the remainder of the bushing assembly for clarity.
Figure 4:
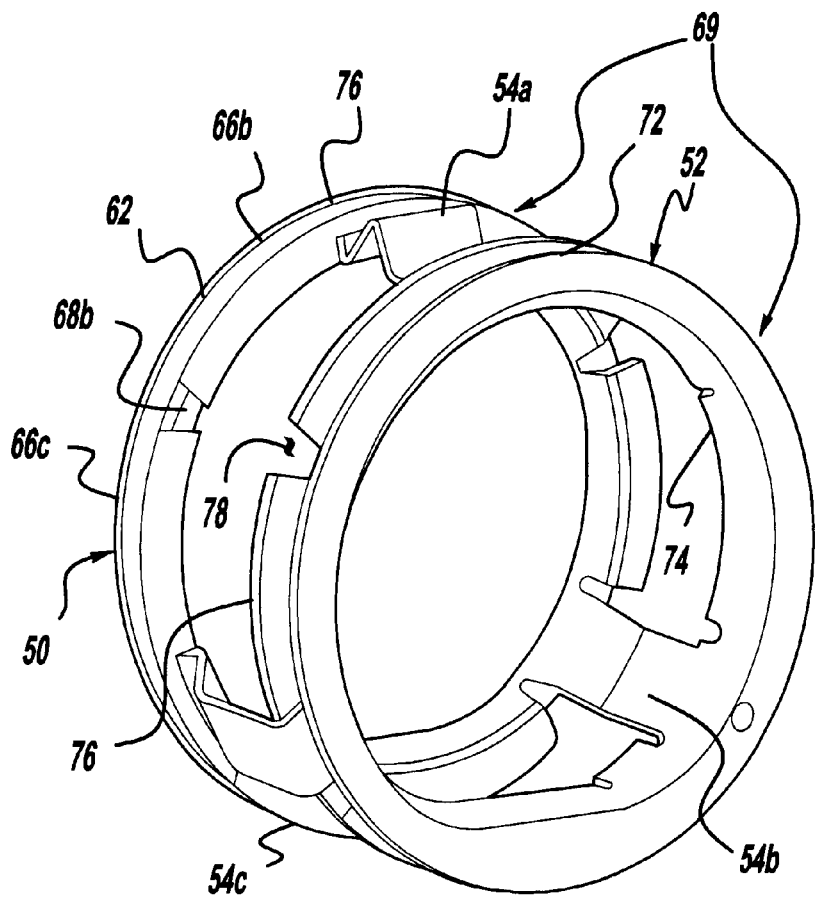
FIG. 4 is a rear perspective view of the inner support structure of FIG. 3.
Figure 5:
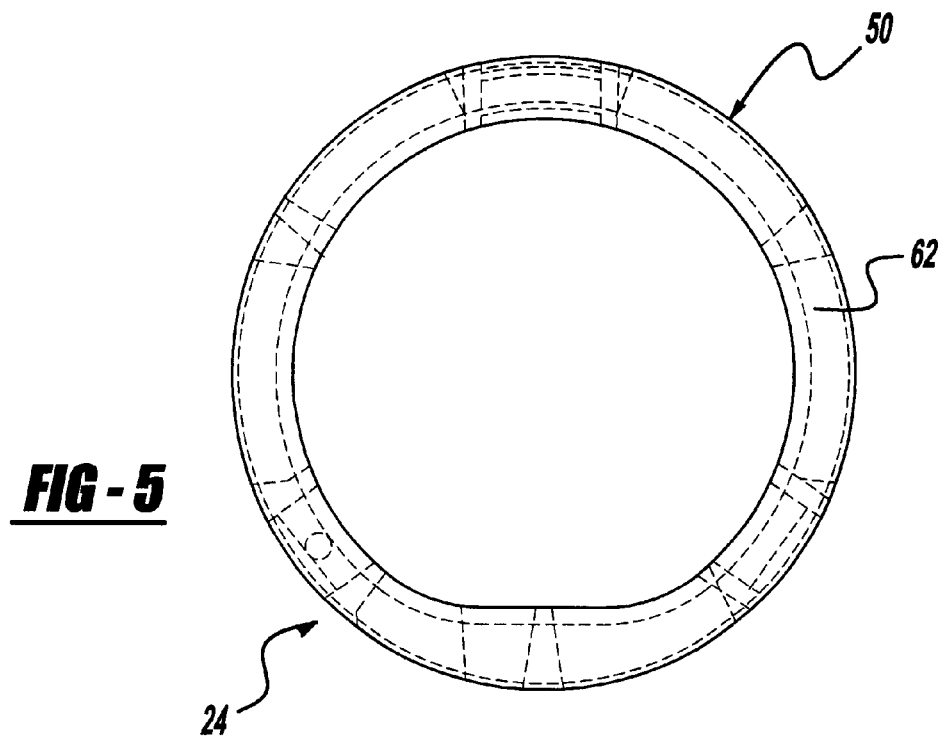
FIG. 5 is a side view of the inner support structure of FIG. 4.

In FIG. 2, the bushing assembly 12 is illustrated separately from the engine mount 10 for clarity. As stated above, the bushing assembly 12 includes the core 20, the inner support structure 24, and the elastomeric material 26. After the elastomeric material 26 is bonded to the core 20 and the inner support structure 24, the bushing assembly 12 is received in the can 30.

The inner support structure 24 is removed from the bushing assembly 12 in FIGS. 3–7 for clarity. The inner Support structure 24 includes a first ring 50, a second ring 52, and interconnecting legs 54A–54C. In other embodiments, more or less legs can be used between the rings 50 and 52.

The first ring 50 includes an annular wall 60, and outer end wall 62, and an inner end wall 64. Preferably, the elastomeric material 26 covers or encapsulates end walls 62 and 64 during a bonding operation. The outer end wall 62 and the inner end wall 64 provide sealing and structural support surfaces for the bushing assembly 12. As illustrated best in FIG. 7, the inner end wall 64 includes a plurality of segments 66A–66I that are spaced apart from one another by relief notches 68A–68I. The relief notches 68 are formed at predetermined draft angles to assist in the forming process. In other embodiments, more or less segments 66 and relief notches 68 can be provided in the inner end wall 64. The formation of segments 66 and relief notches 68 permits the material of the inner support structure 24 to be drawn as desired. Preferably, relief bends 69 are provided in legs 54 to assist in the forming process.

The second ring 52 includes an annular wall 70, and outer end wall 72, and an inner end wall 74. In a manner similar to inner end wall 64, the inner end wall 74 includes a plurality of segments 76 that are spaced apart from one another by relief notches 78.

The inner support structure 24 is a one-piece member, preferably formed from a blank of metal through a drawing process. A preferred material is draw quality 1008-1010 steel, which combines the required forming ability with good strength and geometric stability. Thus, the first ring 50, second ring 52, and legs 54A–54C are formed as an integral element and do not require any connecting or fastening processes. In other words, no post-forming operations are required to form the one-piece inner support structure 24. The formation of a one-piece inner support structure 24 eliminates post-forming operations such as welding required by prior art designs.

After forming is complete, the inner support structure 24 can be surface prepped through a light media blast, coated with primer and adhesive (bonding agent), and then encapsulated with the elastomeric material 26 through injection molding.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. An inner support structure for a hydraulic engine mount comprising:
   a first ring having an annular wall, an outer end wall, and an inner end wall, with the inner end wall of the first ring including a plurality of segments spaced apart by relief notches;
   a second ring having an annular wall, an outer end wall, and an inner end wall; and
   a plurality of legs integrally formed with and between the first and second rings, wherein the first ring, the second ring, and the legs are formed as a one-piece component that does not require a post-forming operation.

2. The inner support structure specified in claim 1 wherein at least one leg includes a relief bend.

3. The inner support structure specified in claim 1 wherein the inner end wall of the second ring includes a plurality of segments spaced-apart by relief notches.

4. The inner support structure specified in claim 1 wherein each leg includes a relief bend.

5. A bushing assembly for a hydraulic engine mount comprising;
   a core;
   an inner support structure; and
   an elastomeric material bonded to an outer surface of the core and encapsulating the inner support structure,
   wherein the inner support structure includes
     a first ring having an annular wall, an outer end wall, and an inner end wall;
     a second ring having art annular wall, an outer end wall, and an inner end wall; and
     a plurality of legs integrally formed with and between the first and second rings, with each of the legs including a relief bend, and wherein the first ring, the second ring, and the legs arc formed as a one-piece component that does not require a post-forming operation.

6. The bushing assembly specified in claim 5 wherein the inner end wall of the first ring includes a plurality of segments spaced-apart by relief notches.

7. The bushing assembly specified in claim 5 wherein the inner end wall of the second ring includes a plurality of segments spaced-apart by relief notches.

8. The bushing assembly specified in claim 7 wherein the inner end wall of the first ring includes a plurality of segments spaced apart by relief notches.

9. A hydraulic engine mount comprising:
   a bushing assembly having a core bonded to an inner support structure by an elastomeric material, the inner support structure having
     a first ring having an annular wall, an outer end wall, and an inner end wall, with the inner end wall of the first ring including a plurality of segments spaced apart by relief notches;
     a second ring having an annular wall, an outer end wall, and an inner end wall; and
     a plurality of legs integrally formed with and between the first and second rings, wherein
     the first ring, the second ring, and the legs are a one-piece component that does not require a post-forming operation; and
   a housing receiving the bushing assembly,
   wherein fluid chambers are formed between the bushing assembly and the housing.

10. The hydraulic engine mount specified in claim 9 wherein at least one leg includes a relief bend.

11. The hydraulic engine mount specified in claim 9 wherein the inner end wall of the second ring includes a plurality of segments spaced-apart by relief notches.

12. The hydraulic engine mount specified in claim 9 wherein each leg includes a relief bend.

* * * * *

UNITED STATES PATENT AND TRADEMARK OFFICE
CERTIFICATE OF CORRECTION

PATENT NO.    : 6,557,838 B2
DATED         : May 6, 2003
INVENTOR(S)   : Todd Michael Wirges It is certified that error appears in the above-identified patent and that said Letters Patent is hereby corrected as shown below:

Column 2,
Line 42, "arid" should read -- and --; and
Between lines 47 and 48, add the following paragraph -- A fastener 50 is received in the passage 22 to attach the engine mount 10 to a bracket 52, which is attached to the engine 16. In other applications, other brackets (not illustrated) can be used to connect bracket 52 to the engine 16. --.

Column 4,
Line 12, "art" should read -- an --; and
Line 17, "arc" should read -- are --.

Signed and Sealed this

Fourteenth Day of October, 2003

JAMES E. ROGAN
*Director of the United States Patent and Trademark Office*